May 7, 1957 H. F. STILLWELL 2,791,689

HIGH INPUT IMPEDANCE COMPARATOR

Filed Sept. 8, 1953

INVENTOR.
HARRY F. STILLWELL
BY [signature]
ATTORNEY 2,791,689

HIGH INPUT IMPEDANCE COMPARATOR

Harry F. Stillwell, Cedar Rapids, Iowa, assignor to Collins Radio Company, Cedar Rapids, Iowa, a corporation of Iowa Application September 8, 1953, Serial No. 379,013

5 Claims. (Cl. 250—27)

This invention relates generally to comparators and particularly to a comparator circuit that utilizes a high impedance-low power driving source.

A comparator is defined herein as a circuit which indicates when two voltages have the same amplitude. The voltages may both vary or one may be constant while the other varies.

The indication of voltage equality may be marked by a pulse or the edge of a square wave.

The embodiment herein is described with respect to a sinusoidal voltage and zero voltage level; however, it is to be understood that any two voltages may be compared.

This invention is an improvement on the conventional comparator circuit shown in Figure 9.22 on page 345 in volume 19 of "Radiation Laboratory Series" by the Massachusetts Institute of Technology.

Conventional high definition comparators as cited above have their signal source impedance in series with their regenerative circuit. They cannot therefore operate with a large source impedance because most of the voltage in the regenerative circuit would be absorbed. The conventional circuit can therefore properly function only with a low source impedance.

It is an object of this invention to provide a high definition comparator which operates with a very large signal source impedance.

A large sinusoidal voltage is required to accurately trigger a comparator.

The conventional comparator requires a large power input because a large current must be provided through its small input impedance to maintain the large triggering voltage.

It is another object of this invention to provide a comparator circuit that is accurately triggered by a low power signal.

Comparators are used in equipment such as radar, television, multiplex and many others. They require fewer amplifier stages and smaller power supply capacity when used with this invention because of its smaller power requirements. The overall size, weight and cost of such equipment is accordingly reduced.

It is therefore still another object of this invention to provide a comparator circuit that economizes associated equipment.

This invention provides a bypass across the signal source impedance which opens up during the regenerative cycle and allows the regenerative circuit to shunt the source impedance. No voltage is then lost to a large source impedance. The accuracy of the comparator is accordingly increased.

Further objects, advantages and features of this invention will be apparent to a person skilled in the art upon further study of the specification and drawings, in which.

This invention consists generally of a diode which is shunt connected across a large impedance signal source. Diode polarity is determined by connecting its plate to the ungrounded side of the source.

Figure 1:
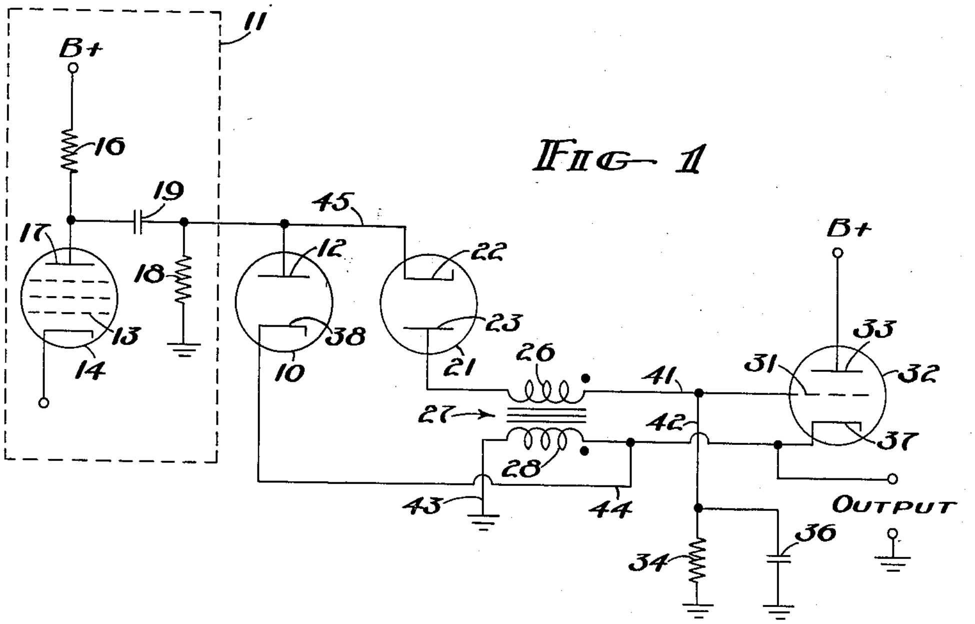
Figure 1 is a schematic diagram of an embodiment of this invention.

An embodiment of this invention is schematically illustrated in Figure 1. It shows the high impedance signal source 11 as a pentode amplifier. An input signal drives the control grid 13 of a pentode 14. A load resistor 16 is connected between the plate 17 and a B plus power supply. The output signal is taken across a large resistor 18 that is connected to plate 17 through a blocking condenser 19.

The comparator circuit includes a selector diode 21 that has its cathode 22 connected to the ungrounded side of coupling resistor 18.

One side of the primary 26 of a transformer 27 is connected to the plate 23 of diode 21, and the other side of primary 26 is connected to the grid 31 of a triode 32. The plate 33 of triode 32 is directly connected to the B plus supply voltage.

A grounded resistor 34 is connected to grid 31, and a capacitor 36 is connected in parallel with grid resistor 34.

The secondary 28 of transformer 27 has one side grounded and its other side connected to the cathode 37 of triode 32. Both primary 26 and secondary 28 have the same polarity.

The diode 10 has its plate 12 connected to the ungrounded side of coupling resistor 18 and its cathode 38 connected to the ungrounded side of secondary 28.

The comparator output is taken between cathode 37 and ground, from an additional transformer winding, or from the plate of triode 32, if an impedance is inserted between the plate and the B plus supply voltage.

The illustrated embodiment compares a sine wave input to zero voltage. The amplitude of the sine wave signal must be large compared to any possible variation from zero of selector diode conduction voltage in order to maintain high definition. For example, if the input voltage peak is 40 volts, the instant of zero volts will virtually coincide with the instant of 0.1 volt because the base portion of a high amplitude voltage loop is substantially vertical. Diodes often require approximately 0.1 volt to begin conduction.

This invention allows a very small signal to be applied to control grid 13 of pentode 14. The high pentode gain provides a large input voltage across coupling resistor 18, and very little power exists in the voltage amplified signal.

Figures 2, 3:
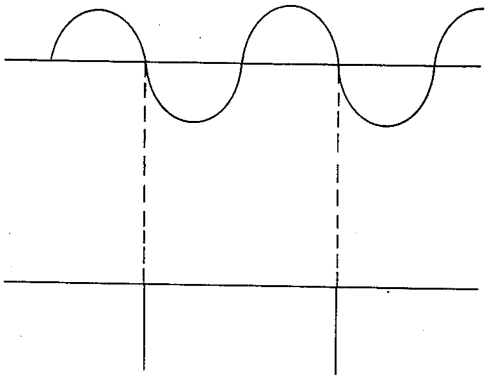
Figure 2 illustrates a signal voltage that might be applied at the input terminals of this invention.
Figure 3 illustrates the output pulses obtained when the signal of Figure 2 is applied.

The circuit in Figure 1 provides an output pulse at the instant that the signal voltage begins a negative loop as shown in Figures 2 and 3. The pulse has a large amplitude and a very short duration.

Circuit operation is described below for a positive and negative loop of signal voltage. A positive loop drives plate 12 of shunt diode 10 positive, and it conducts the positive loop to ground. No conduction can occur through selector diode 21 because the positive voltage on its cathode 22 is higher than the zero ground potential on its plate.

As a negative loop begins, the voltage across diode 10 reverses and no conduction can occur through it. However, the negative voltage on cathode 22 of diode 21 is lower than its ground plate voltage and it conducts to begin a regeneration cycle.

Regeneration occurs through a circuit which consists of primary 26, lead 41, lead 42, resistor 34 from ground to lead 43, secondary 28, lead 44, shunt diode 10, lead 45, and selector diode 21. This circuit connects primary 26 and secondary 28 in series with aiding polarity which furthers the rapidity and strength of regeneration.

The conduction current from diode 21 passes through primary 26 and excites a negative voltage in secondary 28 that quickly drives cathode 37 negative. Triode 32 almost instantaneously decreases its plate current which passes through secondary 28 to further excite primary 26 which again decreases its current and again excites secondary 28 to continue the cycle of regeneration. The regenerating current very rapidly increases to a cutoff point and then very rapidly ends to form a very narrow pulse of large amplitude at the circuit output terminals.

The driving signal loses control of the circuit the instant regeneration begins.

As soon as regeneration ends, the negative input signal loop still exists and will stimulate a series of regeneration cycles unless certain precautions are taken as stated below. A series of pulses might be desirable in some applications but are assumed undesirable for present descriptive purposes.

The negative voltage across grid resistor 34 during regeneration charges capacitor 36. When regeneration ends, capacitor 36 discharges through grid resistor 34 and maintains grid 31 sufficiently negative to prevent the occurrence of regeneration during the remainder of the negative signal loop.

The time constant of resistor 34 and capacitor 36 should be sufficiently small to allow circuit recovery before the next pulse but should be sufficiently large to maintain tube 32 below cut-off for most of the time between pulses in order to maintain low power dissipation in tube 32.

The absence of a plate resistor in tube 32 provides a more accurate comparator. The resistance in series with the inductance of secondary 28 is reduced and current decay during regeneration therefore occurs more rapidly. The duration of the output pulse is thereby shortened and the amplitude of the output pulse is thereby increased.

It is therefore seen that this invention provides a high definition comparator which may be driven by a low power-high impedance signal source. The cost, size and weight of equipment is accordingly reduced wherever used with this invention.

Although this invention has been described with respect to preferred embodiments thereof, it is not to be so limited as changes and modifications may be made therein which are within the full intended scope of the invention, as defined by the appended claims.

I claim:

1. A regeneration type comparator circuit which utilizes a high impedance source that is grounded on one side and comprising, electron control means having at least a cathode, plate and control grid; a unidirectional regenerative circuit connected at intermediate points to the source and the electron control means, said regenerative circuit including a pair of diodes with the cathode of the first diode connected to the plate of the second diode, a transformer with its primary connected on one side to the plate of the first diode and its secondary connected on one side to the cathode of the second diode, the other side of said secondary connected to ground, a resistor connected at one end to ground and connected at the other end to the control grid of the electron control means and the remaining side of said primary, the cathode of said control means also connected to the ungrounded end of the secondary, and the ends of the primary and secondary connected respectively to the control grid and cathode of the electron control means having the same instantaneous polarity, whereby a negative actuation on the cathode of the first diode causes a regenerative buildup of unidirectional current in the circuit comprising the pair of diodes, transformer primary and secondary, and the resistor.

2. A regeneration type comparator circuit which utilizes a high impedance source that is grounded on one side comprising, a first diode with its cathode connected to the ungrounded side of said source, a transformer with one side of its primary connected to the plate of said first diode, a triode with its control grid connected to the other side of said primary, one side of the secondary of said transformer connected to ground and its other side connected to the cathode of said triode, a resistor connected between the grid of said triode and ground, a condenser connected across said resistor, a second diode with its plate connected to the cathode of said first diode, the cathode of said second diode connected to the ungrounded side of said secondary, and the polarities of said primary and secondary arranged so that a decrease in plate current of the triode causes a negative voltage induced in the primary, and the time-constant of said capacitor and resistor adjusted to control the number of regenerations.

3. A comparator circuit for operation with a low power-high impedance signal source comprising, a first diode with its cathode connected to said drive source, a triode tube, a transformer with its primary connected between the plate of said first diode and the grid of said triode, the secondary of said transformer connected between ground and the cathode of said triode tube, and a second diode with its cathode connected to the ungrounded side of said secondary and its plate connected to the cathode of said first diode, and the instantaneous polarities of the primary and secondary being the same at their ends connected respectively to the grid and cathode of the triode.

4. A regenerative pulse forming circuit comprising, a pair of serially connected diodes with the cathode of one connected to the plate of the other; an electron discharge device having at least a plate, cathode and control grid; a transformer, the primary of said transformer connected between the control grid and the remaining plate of one of said diodes, the secondary of said transformer connected between ground and the remaining cathode of said diodes, the end of said secondary which is connected to ground having opposite polarity from the end of said primary connected to said electron discharge device, and a resistor connected between ground and the grid of said electron discharge device, whereby negative trigger pulses actuate the circuit to cause sudden regeneration in the circuit comprising the pair of diodes, the resistor, and the primary and secondary to form the output pulses.

5. A regenerative pulse forming circuit comprising, a pair of electron control devices each having at least a plate and cathode and asymmetric conduction qualities, the cathode of the first control device connected to the plate of the second control device; an electron discharge device having at least a cathode, control grid and plate; a transformer with its primary connected on one side to the plate of the first control device and with its primary connected on the other side to the grid of said discharge device, the secondary of said transformer connected on one side to the cathode of said discharge device, the side of the secondary connected to the cathode of the discharge device having the same polarity as the side of the primary connected to the control grid of the discharge device, and a resistor connected between the control grid and the remaining end of said secondary, whereby a negative actuation of said control grid causes a regenerative reaction in the circuit to form a pulse of plate current in said discharge device.

References Cited in the file of this patent

UNITED STATES PATENTS

| | | |
|---|---|---|
| 2,411,648 | Brauer et al. | Nov. 26, 1946 |
| 2,432,227 | Dailey et al. | Dec. 9, 1947 |
| 2,540,923 | Williams | Feb. 6, 1951 |